(12) United States Patent
Timonen et al.

(10) Patent No.: US 12,430,843 B2
(45) Date of Patent: Sep. 30, 2025

(54) GENERATING LIGHTING MAP USING AMBIENT LIGHT SENSOR AND TRACKING CAMERA

(71) Applicant: Varjo Technologies Oy, Helsinki (FI)

(72) Inventors: Ville Timonen, Helsinki (FI); Tuomas Tölli, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 144 days.

(21) Appl. No.: 18/508,498

(22) Filed: Nov. 14, 2023

(65) Prior Publication Data

US 2025/0157140 A1 May 15, 2025

(51) Int. Cl.
*G06T 15/00* (2011.01)
*G02B 27/01* (2006.01)
*G06T 15/50* (2011.01)
*G06V 10/56* (2022.01)
*G06V 10/60* (2022.01)

(52) U.S. Cl.
CPC ........ *G06T 15/506* (2013.01); *G02B 27/0172* (2013.01); *G06V 10/56* (2022.01); *G06V 10/60* (2022.01)

(58) Field of Classification Search
CPC ............ G06T 15/506; G02B 27/0172; G02B 27/017; G02B 2027/0118; G02B 2027/0138; G06V 10/56; G06V 10/60
See application file for complete search history.

(56) References Cited

U.S. PATENT DOCUMENTS

| | | | |
|---|---|---|---|
| 9,551,871 B2 | 1/2017 | Sugden et al. | |
| 10,540,812 B1 | 1/2020 | Yildiz et al. | |
| 2006/0152524 A1* | 7/2006 | Miller | G11B 20/00086 345/589 |
| 2010/0054592 A1* | 3/2010 | Nanu | G06T 5/94 382/167 |
| 2019/0102936 A1 | 4/2019 | Neulander et al. | |
| 2020/0410772 A1 | 12/2020 | Silverstein et al. | |
| 2021/0373343 A1* | 12/2021 | Baerenrodt | G02F 1/29 |

(Continued)

OTHER PUBLICATIONS

European Patent Office, Extended European Search Report, Application No. 24207510.9, Mailed Apr. 29, 2025, 7 pages.

(Continued)

*Primary Examiner* — Sarah Lhymn
(74) *Attorney, Agent, or Firm* — ZIEGLER IP LAW GROUP, LLC.

(57) ABSTRACT

Disclosed is head-mounted display (HMD) apparatus with an ambient light sensor (ALS), tracking camera (TC), video-see-through (VST) camera, and processor(s) configured to: capture average red-green-blue (RGB) illuminance (A) of region of real-world environment (RE) from HMD pose; capture grayscale image (GI) of RE from HMD pose, wherein pixel values indicate intensities (i); calculate average TC intensity (I) for part of FOV of TC that overlaps with FOV of ALS, based on intensities (i); calculate average illuminance (J) for said part of FOV of TC that overlaps with FOV of ALS, based on intensities (i) and pre-determined response (r) of ALS; calculate corrected average RGB illuminance (AC) for region from HMD pose, based on A and ratio of I and J; and determine RGB illuminance for each pixel of GI, based on AC, ratio of intensity (i) of said pixel in GI to I.

14 Claims, 2 Drawing Sheets

(56) References Cited

U.S. PATENT DOCUMENTS

| | | | |
|---|---|---|---|
| 2023/0186810 A1* | 6/2023 | Yu | H04N 23/71 345/690 |
| 2024/0161706 A1* | 5/2024 | Wanat | G09G 3/001 |

OTHER PUBLICATIONS

Legendre, Chloe. "Compositing Real and Virtual Objects with Realistic, Color-Accurate Illumination", XP055648669, pp. 1-204, Jan. 1, 2019, Retrieved from the Internet: URL:http://digitallibrary.usc.edu/cdm/compoundobject/collection/p15799coll89/id/205304/rec/1.

\* cited by examiner

GENERATING LIGHTING MAP USING AMBIENT LIGHT SENSOR AND TRACKING CAMERA

TECHNICAL FIELD

The present disclosure relates to head-mounted display apparatuses. Moreover, the present disclosure relates to methods implemented by head-mounted display apparatuses.

BACKGROUND

In the recent decade, mixed-reality (MR) is actively being explored which merges virtual-reality (VR) objects with a real-world environment in an interactive and an immersive way, when a user wears a head-mounted display (HMD) on his/her head. In this regard, the VR objects appear as a natural part of the real-world environment. Conventionally, in fully synthetic scenes, VR light sources are used to render the VR objects, otherwise the VR objects would appear black. In applications related to MR when the VR objects are rendered in the real-world environment, the VR objects need to be illuminated by light emitted by light sources available in the real-world environment.

Despite progress in HMD apparatuses used for displaying mixed-reality, existing techniques and equipment for rendering the VR objects has several limitations associated therewith. Firstly, an illumination of the light emitted by the light sources is not captured properly. Hence, not all incoming light is accounted for. Secondly, when rendering the VR object in the real-world environment, reflections casted by the VR object are missing towards certain areas. Thirdly, the user wearing the HMD apparatus needs to scan the real-world environment by rotating their head around at a start of a session of the MR. This is not user-friendly, and is not applicable for situations where lighting changes outside a current field-of-view (FOV) of the HMD apparatus from a given pose. Furthermore, if an amount of light in the real-world environment varies (for example, the light sources are switched on or off, curtains are drawn or open), then the user needs to scan the real-world environment again or otherwise see mismatched real illumination with respect to virtual illumination. Moreover, the reflections of the VR objects are also not updated unless the user faces the changes in light emitted from the light sources.

The aforementioned problems can be addressed by employing a plurality of high-definition range (HDR) visible-light cameras, to cover larger FOV as compared to existing visible-light cameras. However, the HDR visible-light cameras require large bandwidths, are expensive and difficult to integrate into the HMD apparatus. Alternatively, other cameras (for example, monochromatic tracking cameras) can be used to capture light emitted from the light sources. However, such other cameras are employed for tracking purposes and therefore saturates direct lights, which makes it possible to capture total incident light accurately. Hence, the VR objects illuminated using such data would appear too dark or too bright and of incorrect colour tone. Additionally, the user is shown previous frames captured by the HDR visible-light cameras, as current frames are under-exposed or over-exposed for HDR bracketing, that cannot be shown to the user due to visual reasons. The frames can be time-warped, but it may cause the frames to be choppy or have uneven movement of dynamic objects within the view.

Therefore, in light of the foregoing discussion, there exists a need to overcome the aforementioned drawbacks.

SUMMARY

The aim of the present disclosure is to provide a head-mounted display apparatus, and a method implemented by the head-mounted display apparatus to generate lighting map with correct total amount of incident light, correct overall tone of the incident light, and an approximate distribution of the incident light. The aim of the present disclosure is achieved by head-mounted display apparatuses, and methods implemented by the head-mounted display apparatuses as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers, or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
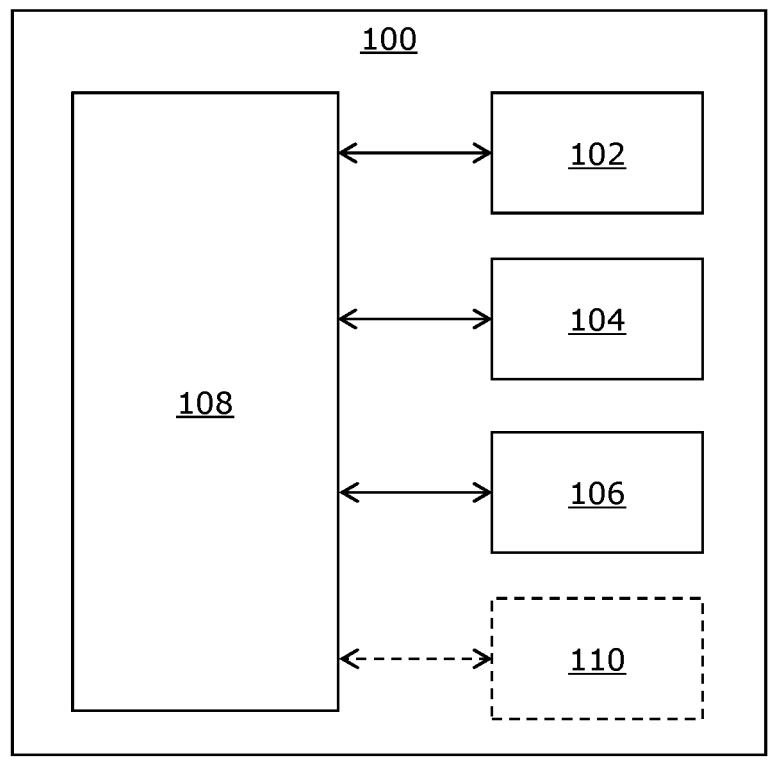
FIG. 1 shows a block diagram of an architecture of a head-mounted display (HMD) apparatus, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a head-mounted display (HMD) apparatus comprising:
an ambient light sensor;
a tracking camera, wherein at least a part of a field of view (FOV) of the tracking camera overlaps with an FOV of the ambient light sensor;

a video-see-through (VST) camera; and
at least one processor configured to:
- capture, using the ambient light sensor, an average red-green-blue (RGB) illuminance (A) of a given region of a real-world environment from a given HMD pose, wherein the given region of the real-world environment corresponds to the FOV of the ambient light sensor from a perspective of the given HMD pose;
- capture, using the tracking camera, a grayscale image of the real-world environment from the given HMD pose, wherein values of pixels in the grayscale image indicate intensities (i) of the pixels;
- calculate an average tracking-camera intensity (I) for the part of the FOV of the tracking camera that overlaps with the FOV of the ambient light sensor, based on intensities (i) of those pixels in the grayscale image that correspond to said part of the FOV of the tracking camera;
- calculate an average illuminance (J) for said part of the FOV of the tracking camera that overlaps with the FOV of the ambient light sensor, based on the intensities (i) of those pixels in the grayscale image that correspond to said part of the FOV of the tracking camera and a pre-determined response (r) of the ambient light sensor;
- calculate a corrected average RGB illuminance (AC) for the given region of the real-world environment from the given HMD pose, based on the average RGB illuminance (A) of the given region and a ratio of the average tracking-camera intensity (I) and the average illuminance (J); and
- determine an RGB illuminance for each pixel of the grayscale image that corresponds to said part of the FOV of the tracking camera, based on the corrected average RGB illuminance (AC) for the given region, a ratio of an intensity (i) of said pixel in the grayscale image to the average tracking-camera intensity (I).

The aforementioned HMD apparatus has the ambient light sensor, the tracking camera, and the VST camera integrated therein, which enables the HMD apparatus to reconstruct a lighting map of the real-world environment with a correct total amount of incident light, a correct overall tone of the incident light, and an approximate distribution of the incident light throughout the lighting map. A synergistic effect of the aforementioned features is that the ambient light sensor is used to provide information related to a direction of the incident light, the tracking data captures the grayscale image to provide information related to illumination, and the VST camera is used to provide a correct RGB colour data. Hence, the lighting map is reconstructed in a simple, fact, accurate manner, and is continuously improved. The HMD apparatus is well-known in the art and does not require any special lens setup for 30 image capturing and are not based on any machine-learning based algorithm to reconstruct the lighting map. Hence, a visual experience provided to the user is realistic and immersive when a mixed-reality experience is provided to the user. A technical benefit of providing such mixed-reality experience to the user is that a wide FOV lighting map is reconstructed, hence the user need not scan the real-world environment by rotating their head. This makes said mixed-reality experience user-friendly.

In a second aspect, the present disclosure provides a method implemented by a head-mounted display (HMD) apparatus comprising an ambient light sensor, a tracking camera, a video-see-through (VST) camera, and at least one processor, wherein the method comprises:
- capturing, using the ambient light sensor, an average red-green-blue (RGB) illuminance (A) of a given region of a real-world environment from a given HMD pose, wherein the given region of the real-world environment corresponds to an FOV of the ambient light sensor from a perspective of the given HMD pose;
- capturing, using the tracking camera, a grayscale image of the real-world environment from the given HMD pose, wherein values of pixels in the grayscale image indicate intensities (i) of the pixels;
- calculating an average tracking-camera intensity (I) for a part of an FOV of the tracking camera that overlaps with the FOV of the ambient light sensor, based on intensities (i) of those pixels in the grayscale image that correspond to said part of the FOV of the tracking camera;
- calculating an average illuminance (J) for said part of the FOV of the tracking camera that overlaps with the FOV of the ambient light sensor, based on the intensities (i) of those pixels in the grayscale image that correspond to said part of the FOV of the tracking camera and a pre-determined response (r) of the ambient light sensor;
- calculating a corrected average RGB illuminance (AC) for the given region of the real-world environment from the given HMD pose, based on the average RGB illuminance (A) of the given region and a ratio of the average tracking-camera intensity (I) and the average illuminance (J); and
- determining an RGB illuminance for each pixel of the grayscale image that corresponds to said part of the FOV of the tracking camera, based on the corrected average RGB illuminance (AC) for the given region, a ratio of an intensity (i) of said pixel in the grayscale image to the average tracking-camera intensity (I).

The aforementioned method used for generating the lighting map facilitates reconstruction of a lighting map of the real-world environment with a correct total amount of incident light, a correct overall tone of the incident light, and an approximate distribution of the incident light throughout the lighting map. A synergistic effect of the aforementioned features is that information related to a direction of the incident light and information related to illumination using the grayscale image are obtained. Hence, the lighting map is reconstructed in a simple, fact, accurate manner, and is continuously improved. Hence, a visual experience provided to the user is realistic and immersive when a mixed-reality experience is provided to the user. The method is simple, robust, fast, reliable, and can be implemented with ease.

Throughout the present disclosure, the term "head-mounted display apparatus" refers to a specialized equipment that is configured to present an extended-reality (XR) environment to the user when the head-mounted display (HMD) apparatus in operation is worn by the user on his/her head. In such an instance, the HMD apparatus acts as a device (for example, such as an XR headset, a pair of XR glasses, and the like) that is operable to present a visual scene of the XR environment to the user. Throughout the present disclosure, the term "extended-reality" encompasses virtual reality (VR), augmented reality (AR), mixed reality (MR), and the like.

Throughout the present disclosure, the term "ambient light sensor" is an electronic component that detects and measures a level of ambient light in a real-world environment. The ambient light sensor measures an illuminance of the ambient light, wherein a unit of measurement may be lux. Herein, the term "illuminance" refers to a measure of an amount of light (for example, such as the ambient light) that falls on a unit area of the ambient light sensor. The ambient light sensor is sensitive to visible light. The ambient light sensor is implemented as an internal component of the head-mounted display. The ambient light sensor is arranged on top of the HMD apparatus to capture light emanated from light sources that are arranged on a ceiling of the real-world environment. The ambient light sensor has only one (multi-coloured) pixel, which captures the ambient light across its full field of view (FOV). The FOV of the ambient light sensor is at most 180 degrees (i.e., a hemisphere). Examples of the ambient light sensor may include, but are not limited to, a phototransistor, a photodiode, and a photonic integrated circuit.

Throughout the present disclosure, the term "tracking camera" refers to an equipment that is operable to detect and process light signals from the real-world environment, to capture monochromatic images (i.e., grayscale images) of the real-world environment. The tracking camera is selected in a manner that it captures images from a wide-angle view. The tracking camera is arranged on top of the HMD apparatus to capture images of the real-world environment of the top and at least a front of the user. In this regard, the FOV of the tracking camera is at most 180 degrees. The FOV of the tracking camera completely overlaps the FOV of the ambient light sensor. That means that the tracking camera and the ambient light sensor cover the same FOV. The tracking camera utilises a short exposure time which enables the tracking camera to be sensitive. Herein, when the tracking camera is sensitive, that means, there is low noise and less motion blur. The tracking camera is highly sensitive when the ambient light is allowed to arrive at every pixel, so that none of the ambient light that is incoming is wasted in any optical filter. This means every pixel shows a sum of the infrared light and the visible light, and the result is therefore monochromatic.

Optionally, the tracking camera is implemented as a combination of a visible-light camera and an infrared-light camera. In this regard, the tracking camera incorporates visible-light sensors and infrared-light sensors. Herein, the visible-light sensor captured visible-light images in a visible-light spectrum, while the infrared-light sensor detects thermal signature in infrared-light spectrum. Subsequently, data from the visible-light sensor and the infrared-light sensor are combined to form grayscale images (as will be described later). Examples of the tracking camera may include, but are not limited to, a Red-Green-Blue (RGB) camera, a Red-Green-Blue-Alpha (RGB-A) camera, a Red-Green-Blue-Depth (RGB-D) camera, a standard-dynamic range (SDR) RGB camera, an event camera, a monochrome camera, an infrared camera, a structured-light scanner, any non-high-dynamic range (HDR) RGB camera.

Throughout the present disclosure, the term "video-see-through camera" refers to another equipment that is operable to detect and process light signals from the real-world environment, to capture RGB images of the real-world environment. The video-see-through (VST) camera overlays images onto the FOV of the user based on a given pose of the HMD, on a transparent or a semi-transparent display, to create the AR or the MR. The VST camera captures sharp RGB images of the real-world environment. The VST camera is arranged in front of the HMD apparatus to capture images from the given HMD pose (i.e., to capture the real-world environment that is present in the FOV of the user), and the captured images are overlayed on a display of the HMD apparatus.

Typically, the FOV of the tracking camera is wider than the FOV of the ambient light sensor. The aforementioned HMD apparatus and the aforementioned method are susceptible to be utilised for cases where the FOV of the tracking camera is wider than the FOV of the ambient light sensor as well as for other cases where the FOV of the tracking camera is not wider than the FOV of the ambient light sensor. In such other cases, the HMD apparatus and the method can be utilised by performing the aforementioned steps of the first aspect and the second aspect, respectively, when the HMD apparatus has rotated (when worn by the user), such that the tracking camera has accumulatively captured the full FOV of the ambient light sensor.

Moreover, the aforementioned HMD apparatus and the aforementioned method are susceptible to be utilised in various different cases. For example, the HMD apparatus and the method can be beneficially utilised for cases where an FOV of the VST camera is at least one of: (i) narrower than the FOV of the ambient light sensor, (ii) pointing in a direction that is different from another direction in which the ambient light sensor is pointing.

In implementations where the FOV of the VST camera is narrower than the FOV of the ambient light sensor, the VST camera captures a limited portion of the real-world environment, and the ambient light sensor is used to measure an overall illumination of the real-world environment. In implementations where the FOV of the VST camera and the FOV of the ambient light sensor point in different directions, the FOV of the VST camera and the FOV of the ambient light sensor beneficially provide a greater coverage of the real-world environment, without a need of the user changing a pose of the head when wearing the HMD apparatus.

It will be appreciated that the at least one processor is communicably coupled to the ambient light sensor, the tracking camera, and the VST camera. The at least one processor could be implemented as any one of: a microprocessor, a microcontroller, or a controller. As an example, the at least one processor could be implemented as an application-specific integrated circuit (ASIC) chip or a reduced instruction set computer (RISC) chip.

The term "HMD pose" encompasses both a position and an orientation of the HMD apparatus, when in use. The ambient light sensor captures data indicative of illuminance of the given region of the real-world environment. This data is analysed to determine the RGB illuminance at a pixel level within the given region of the real-world environment. The average RGB illuminance (A) is then determined by averaging the RGB values from all pixels within the given region of the real-world environment. Hence, the average RGB illuminance returns only one value for the given region of the real-world environment, which takes into account a distribution of the red light, the green light, and the blue light in the given region.

Throughout the present disclosure, the term "grayscale image" refers to an image in which each pixel is represented using a single channel or a colour component. The values of the pixels in the grayscale image indicate a brightness level (i.e., the intensity) of the pixel. Herein, the intensity of the pixel indicates how bright or dark each pixel of the grayscale image is, depending on a number of bits used to indicate the value of the colour component of the pixel in the grayscale image. When the number of bits is high, the colour component is at a darkest end (i.e., black colour), and when the number of bits is low, the colour component is at a lightest end (i.e., white colour). The number of bits may be, but not limited to, 8 bits, 10 bits, 12 bits, 16 bits, 24 bits, and so on. As an example, when the number of bits is 8 bits, the values of the pixels in the grayscale image lies in a range of 0-255, and is chosen from amongst a total of 256 values. As another example, when the number of bits is 10 bits, the values of the pixels in the grayscale image lies in a range of 0-1023, and is chosen from amongst a total of 1024 values.

The ambient light sensor provides the average RGB illuminance (A) of the given region of the real-world environment and the tracking camera provides the values of the pixels indicating intensities of the pixels in the grayscale image for same given region. In this regard, the average tracking-camera intensity (I) is calculated by integrating over the hemisphere, limited by the FOV of the ambient light sensor. As an example, the average tracking-camera intensity may be calculated using an exemplary equation (1)

$$I = \frac{\int_\Omega \text{Tracking}(\omega) \cdot ALS_{FoV}(\omega) \, d\omega}{\int_\Omega ALS_{FoV(\omega)} \, d\omega} \quad (1)$$

wherein $\Omega$ denotes a unit sphere, Tracking($\omega$) denotes an intensity of the tracking camera as a function of direction of light $\omega$, and $ALS_{FoV}(\omega)$ denotes a binary function of an intensity of light falling on the unit area of the ambient light sensor as the function of direction of light $\omega$. Herein, the $ALS_{FoV}(\omega)$ returns 1 when the direction of the light is in the same given region, and returns 0 when the direction of the light is not in the same given region. It will be appreciated that the exemplary equation (1) can be implemented in different ways in different use case scenarios, and there can be other formulae to calculate the average tracking-camera intensity.

It will be appreciated that light emanating from a central portion of the FOV of the ambient light sensor is captured accurately by the ambient light sensor as compared to light emanating from periphery of the FOV of the ambient light sensor. The pre-determined response (r) is a function of an angle of incidence of light. Hence, the pre-determined response is different for each portion of the FOV of the ambient light sensor. Consequently, the average illuminance (J) for said part of the FOV of the tracking camera that overlaps with the FOV of the ambient light sensor provides a high weightage to the light emanating from the central portion of the FOV. Upon taking the pre-determined response into account, the average illuminance is calculated. A technical effect of determining the average illuminance in such a manner is that a correct colour tone and intensity of the real-world environment is determined, and distributed according to the values of pixels in the grayscale image.

As an example, the average illuminance (J) may be calculated using an exemplary equation (2), $$J = \frac{\int_\Omega \text{Tracking}(\omega) \cdot ALS_{Resp}(\omega) \, d\omega}{\int_\Omega ALS_{FoV}(\omega) \, dw} \quad (2)$$

wherein $ALS_{Resp}(\omega)$ denotes the pre-determined response of the ambient light sensor as a function of the direction of light $\omega$. Herein, the $ALS_{Resp}(\omega)$ returns 1 when the direction of the light is in the same given region, and returns 0 when the direction of the light is not in the same given region. It will be appreciated that the exemplary equation (2) can be implemented in different ways in different use case scenarios, and there can be other formulae to calculate the average illuminance.

The corrected average RGB illuminance (AC) is determined for the given region of the real-world environment by cancelling/undoing an influence of the pre-determined response. It will be appreciated that the response of the ambient light sensor is different for different portions of the FOV. Hence, the average illuminance for said part of the FOV of the tracking camera that overlaps with the FOV of the ambient light sensor, has unequal weightage throughout the given region of the real-world environment. Hence, the corrected average RGB illuminance is determined by removing the influence of the pre-determined response in the average RGB illuminance (A) of the given region.

It will be appreciated that the ambient light sensor has a response that is dependent on the direction of the incoming light. At steep angles, the response is low, and for light arriving from a normal vector direction of the ambient light sensor, the response is high. It will be appreciated that the response of the ambient light sensor is cosine-weighted with a FOV cutoff based on mechanical obstruction. The ratio I/J essentially removes the direction-dependent response of the ambient light sensor. The resulting corrected average RGB illuminance (AC) then behaves as if the response of the ambient light sensor was uniform across the FOV, and now this corrected average RGB illuminance can be directly distributed onto the grayscale image based on the intensities (i) of those pixels in the grayscale image that correspond to said part of the FOV of the tracking camera. The captured average RGB illuminance already has an effect of the inherent response of the ambient light sensor. In order to negate the aforesaid effect of the response on the captured average RGB illuminance (A), it is multiplied with I/J. A technical effect of calculating the corrected average illuminance in such a manner is that the pre-determined response (r) is negated, which in turn provides uniform illuminance to all the pixels in the grayscale image, by taking the original sensor measurement and the normalization factor.

As an example, the corrected average illuminance (J) may be calculated using an exemplary equation (3), $$AC = A * (I/J) \quad (3)$$

wherein (I/J) is a normalization ratio used to remove the aforementioned response.

It will be appreciated that the exemplary equation (3) can be implemented in different ways in different use case scenarios, and there can be other formulae to calculate the corrected average illuminance.

The RGB illuminance is then determined for each pixel of the grayscale image, as the RGB illuminance is not calculated. This helps to form a light map, that appears as visualised on top of the grayscale image. Notably, a total light intensity, an average light tone of the grayscale image are preserved, which makes the grayscale image with the corrected average RGB illuminance a good approximation for diffuse illumination, and a decent approximation for specular reflections. As an example, the RGB illuminance (i.e. Final_Illuminance($\omega$)) may be calculated using an exemplary equation (4), $$\text{Final\_Illuminance}(\omega) = \frac{\text{Tracking}(\omega)}{I} * ALS_{FoV}(\omega) * AC * V \quad (4)$$

wherein Tracking(ω) denotes an intensity of the tracking camera as a function of direction of light ω, and $ALS_{FoV}(ω)$ denotes a binary function of an intensity of light falling on the unit area of the ambient light sensor as the function of direction of light ω, AC denotes a corrected average RGB illuminance, and V denotes a measured ambient light sensor to VST camera illuminance calibration It will be appreciated that the exemplary equation (4) can be implemented in different ways in different use case scenarios, and there can be other formulae to calculate the RGB illuminance.

It will be appreciated that the tracking camera is typically calibrated, but the ambient light sensor is uncalibrated. In order to calibrate the ambient light sensor, a calibration factor is used. Herein, the calibration factor is used to calibrate the ambient light sensor based on the average RGB illuminance of the VST image captured by the VST camera. In this regard, the VST cameras are also calibrated such that the lux value based on a pixel intensity of the VST camera, ISO, and exposure value is known. The VS camera is typically calibrated such that pictures of a light box grid are taken, where exact lux values of the light box grids are known. For example, there might be 10 different squares in the light box grid, each outputting a different amount of light. The ambient light sensor can be calibrated in various ways, out of which two different ways are explained.

In an embodiment, the at least one processor is configured to:
capture, using the VST camera, a VST image of the real-world environment from the given HMD pose;
determine an uncalibrated RGB illuminance for each pixel of the grayscale image that corresponds to said part of the FOV of the tracking camera, based on the corrected average RGB illuminance (AC) for the given region, the ratio of the intensity (i) of said pixel in the grayscale image to the average tracking-camera intensity (I);
store the uncalibrated RGB illuminance for each pixel of the grayscale image in an uncalibrated lighting map;
find a part of the uncalibrated lighting map that corresponds to said part of the FOV of the VST camera that overlaps with the FOV of the ambient light sensor;
calculate an average uncalibrated RGB illuminance (AU) of pixels of said part of the uncalibrated lighting map;
calculate an average (VI) of RGB illuminance of those pixels of the VST image that correspond to said part of the FOV of the VST camera that overlaps with the FOV of the ambient light sensor; and
determine the RGB illuminance for each pixel of the grayscale image that corresponds to said part of the FOV of the tracking camera, based further on a ratio of the average (VI) of the RGB illuminance and the average uncalibrated RGB illuminance (AU).

In this regard, the VST camera is arranged in such a manner that it aligns with a viewpoint of the HMD apparatus. This ensures that the VST camera captures the VST image of the real-world environment, based on the given HMD pose. The VST image captures colour data of the real-world environment correctly and comprises RGB values that are used to calibrate the ambient light sensor. When the calibration factor is assumed to be 1, the average RGB illuminance captured using the ambient light sensor is uncalibrated. Subsequently, an average of the uncalibrated RGB illuminance is determined using an exemplary equation (5), $$\text{Uncalibrated } RGB \text{ Illuminance} = AC * \left(\frac{i}{I}\right) * \left(\frac{A}{A}\right) \quad (5)$$

wherein the average RGB illuminance (A) is multiplied and divided as the uncalibrated RGB illuminance is determined for said part of the FOV of the tracking camera.

The term "lighting map" refers to a representation of distribution of light across the given region in the real-world environment. The lighting map provides any one of: a visual depiction, a data-based depiction of how the light is distributed throughout the real-world environment and varies in intensity in a particular area. The lighting map can be represented in a two-dimensional (2D) format and/or a three-dimensional (3D) format. The lighting map is composed of pixels, containing information about the average RGB illuminance pertaining to the real-world environment in the said part of the FOV of the tracking camera, wherein the unit of measurement is lux. In this regard, since the ambient light sensor is uncalibrated, the lighting map is also uncalibrated. In that uncalibrated lighting map, the part of the FOV of the VST camera is determined that overlaps with the FOV of the ambient light sensor, so that the ambient light sensor can be calibrated by mapping actual RGB values to that portion in the uncalibrated lighting map. Subsequently, the average uncalibrated RGB illuminance (AU) of pixels of said part is calculated by averaging the RGB values from all pixels of the given part in the uncalibrated lighting map. Thereafter, calculating the average of the RGB illuminance returns a single value of those pixels of the VST image that corresponds to the part of the real-world environment where the FOVs of the VST camera, the tracking camera and the ambient light sensor overlap, as the average of the RGB illuminance can be determined only when the pixels of the VST image and the portion of the FOV of the ambient light sensor is common. The ambient light sensor is then calibrated by determining the RGB illuminance for each pixel of the grayscale image, which is used to correctly distinguish the RGB illuminance coming from the real-world environment.

The average (VI) of the of the RGB illuminance denotes an integral over pixels in the VST image, and the average uncalibrated RGB illuminance (AU) is an integral of the RGB illuminance (as given in exemplary equation (4)) when the calibration factor is assumed to be 1. Both integrals are over a range that is the shared FOV of both the ambient light sensor and the VST camera.

A technical effect of determining the RGB illuminance based on the FOV of the ambient light sensor is that a lighting map is obtained comprising uniform illuminance throughout the lighting map. The integrals and/or averages are compared because the VST image has uniform illuminance, assuming that the VST camera is a well-behaved correctly lens-corrected camera.

In another embodiment, the at least one processor is configured to:
capture, using the VST camera, a VST image of the real-world environment from the given HMD pose;
calculate a weighted average RGB illuminance (AW) captured by said part of the FOV of the VST camera that overlaps with the FOV of the ambient light sensor, by calculating a weighted average of RGB illuminance of those pixels of the VST image that correspond to said part of the FOV of the VST camera that overlaps with the FOV of the ambient light sensor, wherein the weighted average is weighted based on the pre-determined response (r) of the ambient light sensor; and determine the RGB illuminance for each pixel of the grayscale image that corresponds to said part of the FOV of the tracking camera, based further on a ratio of the weighted average RGB illuminance (AW) and the average RGB illuminance (A).

In this regard, the pre-determined response (r) of the different portions of the FOV of the ambient light sensor is different. Hence, when calculating the weighted average RGB illuminance, the pre-determined response is used as the weight. This weighted average RGB illuminance (AW) will correspond to an actual average RGB illuminance (A) of the given region of the real-world environment. Hence, the ratio of the weighted average illuminance and the average RGB illuminance is used to determine the calibration factor to calibrate the uncalibrated ambient light sensor. Herein, the average RGB illuminance (A) captured by the ambient light sensor is untouched, and response from the VST image is altered to match the pre-determined response of the ambient light sensor. Thereafter, the integrals and/or averages can be compared because they use a response curve of the ambient light sensor. The ambient light sensor is then calibrated by determining the RGB illuminance for each pixel of the grayscale image, which is used to correctly distinguish the RGB illuminance coming from the real-world environment.

A technical effect of calibrating the ambient light sensor in a manner described in both the embodiments is that the RGB illuminance captured by the ambient light sensor in an uncalibrated manner is corrected, so that whenever the RGB illuminance for each pixel of the grayscale image that corresponds to said part of the FOV of the tracking camera is converted to corrected physical lux values.

Optionally, the at least one processor is configured to store the determined RGB illuminance for each pixel of the grayscale image in a lighting map. A technical effect of storing the determined RGB illuminance in such a manner is that the lighting map for the entire real-world environment (i.e., 360 degrees) is generated. In this regard, the aforementioned processing steps of the first aspect are repeated for other regions of the real-world environment from different poses of the HMD apparatus, to create the complete lighting map. Hence, the FOV of the ambient light sensor and the FOV of the tracking camera cover the real-world environment in a form of two hemispheres, thereby reducing a need for processing resources and saving time.

Optionally, the HMD apparatus further comprises at least one light source per eye, wherein the at least one processor is configured to:

utilise the lighting map to illuminate at least one virtual object that is to be embedded in an extended-reality image; and display the extended-reality image via the at least one light source.

The term "light source" refers to an element from which light emanates. The at least one light source is optionally arranged per eye of the user. The light source supports different ways of illuminating the FOV of the VST camera. This enables dynamic lighting conditions to be produced in the FOV. Optionally, the at least one light sources emits light in at least one of: an infrared spectrum, a visible-light spectrum. The at least one processor is configured to use information available in the lighting map to illuminate the at least one virtual object in a realistic manner in the extended-reality image. Herein, the term "extended-reality image" refers to an image that comprises a combination of the real-world environment and a virtual environment. In this regard, the extended-reality image integrates the at least one virtual object with the real-world environment and allows the users to interact with the at least one virtual object that appear integrated into the real-world environment. The term "virtual object" refers to a digital representation of an object that is embedded in the extended-reality image, wherein such an object is not physically present in the real-world environment where the HMD apparatus is used. Such virtual objects are typically created using 3D modelling techniques, and can be designed to appear 3D, interactive and responsive when interacting with the user. Examples of such virtual objects may include, but are not limited to, virtual furniture, virtual books, virtual tools, virtual industrial equipment or their parts, a physical object, virtual images, and similar. Examples of the at least one light source may include, but are not limited to, a display, a projector, and a combination of a display and a projector.

Subsequently, lighting conditions for the at least one virtual object are adjusted based on the lighting map, which enables enhancing the integration of the at least one virtual object within the real-world environment, when the HMD apparatus is in use. The at least one virtual object which is embedded in the extended-reality image is presented to the user by employing the at least one light source. A technical effect of presenting the extended-reality image to the user in such a manner is that by adding illumination to the at least one virtual object based on the lighting map (which comprises lighting conditions based on the real-world environment), the at least one virtual object appear to be integrated and realistic, thereby enhancing an overall quality of the extended-reality experience provided when using the HMD apparatus.

Optionally, the at least one processor is configured to:
capture, using the VST camera, a VST image of the real-world environment from the given HMD pose; and
replace the determined RGB illuminance stored for pixels in the lighting map that lie in the FOV of the VST camera with RGB illuminance of corresponding pixels in the VST image.

In this regard, the RGB illuminance (i.e., an actual colour data of the real-world environment) is available from the VST image of the real-world environment and is incorporated into the lighting map. The determined RGB illuminance is replaced for each pixel in the lighting map for each corresponding pixels in the VST image, while keeping track of a total amount of light between the values of pixels in the grayscale image and the RGB illuminance in the VST image. Herein, the total amount of light refers to a total illumination over multiple pixels of the grayscale image. Herein, the FOV of the ambient light sensor and the FOV of the tracking camera provides a wide coverage of the real-world environment. The VST images capture only a part of the FOV of the real-world environment, which is in front of the user. The determined RGB illuminance is replaced for pixels in the lighting map with the RGB illuminance of the corresponding pixels in the VST image when the FOV of the tracking camera and the FOV of the ambient light sensor overlaps with the FOV of the VST. Such overlapping can occur at a same time instant or at different time instants. A technical effect of replacing the determined RGB pixels in such a manner is that it enables gaining information about how the light is distributed within the FOV of the tracking camera and the FOV of the VST camera. The determined RGB illuminance is replaced to correct the stored pixels in the lighting map based on the information, thereby improving the lighting map.

For example, there may be two light sources in the real-world environment, wherein the two light sources may emit light of red colour and blue colour, respectively. The ambient light sensor captures an average RGB illuminance of a given region of a real-world environment. When the tracking camera is used to capture the grayscale image of the real-world environment, the two colours (i.e., the red colour and the blue colour) are indistinguishable from each other. Hence, the pixels of the grayscale image representing the two light sources may have violet colour (i.e., blue colour+ red colour=violet colour). The VST camera captures the VST image of the real-world environment, wherein the light source emitting the blue colour is captured. The pixels in the grayscale image representing the second light source having violet colour is now replaced with the blue colour. The pixels in the grayscale image representing the first light source may still have violet colour, which is incorrect, because the blue colour represented in the VST image does not sum up to a correct amount of the red colour and the blue colour. The blue colour in the average RGB illuminance is reduced, leaving only the red colour for the FOV of the ambient light sensor that overlaps with the FOV of the tracking camera. Hence, the two light sources emitting light of the red colour and the blue colour may be clearly distinguished.

Optionally, the at least one processor is configured to:
determine an average VST-based RGB illuminance (V) for the pixels in the lighting map that lie in the FOV of the VST camera, as an average of the RGB illuminance of the corresponding pixels in the VST image;
calculate a re-balanced average RGB illuminance (AR), by dividing a difference between a first multiplication product of the corrected average RGB illuminance (AC) and the FOV of the ambient light sensor (FOV$_A$) and a second multiplication product of the average VST-based RGB illuminance (V) and an overlapping FOV (FOV$_{AV}$) between the VST camera and the ambient light sensor, with a difference between the FOV of the ambient light sensor (FOV$_A$) and the overlapping FOV (FOV$_{AV}$);
re-calculate the average tracking-camera intensity (I$_R$) for a specific part of the FOV of the tracking camera that overlaps with the FOV of the ambient light sensor, but does not overlap with the FOV of the VST camera, based on intensities (i) of those pixels in the grayscale image that correspond to the specific part of the FOV of the tracking camera; and
re-determine the RGB illuminance for each remaining pixel of the grayscale image that lies outside the FOV of the VST camera, based on the re-balanced average RGB illuminance (AR), the ratio of the intensity (i) of said remaining pixel in the grayscale image to the re-calculated average tracking-camera intensity (I$_R$).

In this regard, the determined RGB illuminance stored for pixels in the lighting map that do not lie in the FOV of the VST camera is considered. Hence, the average VST-based RGB illuminance (V) is determined when the RGB illuminance of the corresponding pixels is known. The average VST-based RGB illuminance (V) is applied to the pixels in the lighting map that do not lie in the FOV of the VST camera. Herein, the FOV comprises a length and a breadth of the given region of the real-world environment. The FOV of the ambient light sensor (FOV$_{AV}$) is greater than the overlapping FOV (FOV$_{AV}$) between the VST camera and the ambient light sensor. Hence, the average RGB illuminance (AR) is re-balanced using an exemplary equation (6), $$AR = \frac{AC \cdot FOV_A - V \cdot FOV_{AV}}{FOV_A - FOV_{AV}} \qquad (6)$$

wherein a colour tone of corresponding pixels in the grayscale image is re-balanced. Herein, AC denotes the corrected average RGB illuminance for the given region of the real-world environment from the given HMD pose, FOV$_{AV}$ denotes the FOV of the ambient light sensor, V denotes the measured ALS to VST camera illuminance calibration, and FOV Av denotes the overlapping FOV between the VST camera and the ambient light sensor.

Subsequently, the average tracking-camera intensity (I$_R$) is re-calculated to determine the intensities of those pixels in the grayscale image wherein the FOV of the tracking camera does not overlap with the FOV of the VST camera. Beneficially, this ensures that remaining pixels in the lighting map, which are not in the FOV of the VST camera, are corrected and the lighting map is improved. Finally, the RGB illuminance for each remaining pixel is re-determined to provide an accurate lighting map. Hence, data from the VST image is preferred whenever available, but changes in data captured by the ambient light sensor and the tracking cameras are monitored, when the FOV of the ambient light sensor that overlaps with the FOV of the tracking camera does not overlap with the FOV of the VST camera. A technical effect of re-determining the RGB illuminance for each remaining pixel of the grayscale image that lies outside the FOV of the VST camera is that the lighting map is corrected for entire 360 degrees of the real-world environment. Optionally, the RGB illuminance for each remaining pixel of the grayscale image is re-determined by any one of: assumed or measured staticisity of the real-world environment, a degree of colour accuracy to be determined based on an amount of planar reflections.

The present disclosure also relates to the aforementioned second aspect as described above. Various embodiments and variants disclosed above, with respect to the aforementioned first aspect, apply mutatis mutandis to the second aspect.

In an embodiment, the method comprises:
capturing, using the VST camera, a VST image of the real-world environment from the given HMD pose;
determining an uncalibrated RGB illuminance for each pixel of the grayscale image that corresponds to said part of the FOV of the tracking camera, based on the corrected average RGB illuminance (AC) for the given region, the ratio of the intensity (i) of said pixel in the grayscale image to the average tracking-camera intensity (I);
storing the uncalibrated RGB illuminance for each pixel of the grayscale image in an uncalibrated lighting map;
finding a part of the uncalibrated lighting map that corresponds to said part of the FOV of the VST camera that overlaps with the FOV of the ambient light sensor;
calculating an average uncalibrated RGB illuminance (AU) of pixels of said part of the uncalibrated lighting map;
calculating an average (VI) of RGB illuminance of those pixels of the VST image that correspond to said part of the FOV of the VST camera that overlaps with the FOV of the ambient light sensor; and
determining the RGB illuminance for each pixel of the grayscale image that corresponds to said part of the FOV of the tracking camera, based further on a ratio of the average (VI) of the RGB illuminance and the average uncalibrated RGB illuminance (AU).

A technical effect of determining the RGB illuminance based on the FOV of the ambient light sensor is that a lighting map is obtained comprising uniform illuminance throughout the lighting map.

In another embodiment, the method comprises:
capturing, using the VST camera, a VST image of the real-world environment from the given HMD pose;
calculating a weighted average RGB illuminance (AW) captured by said part of the FOV of the VST camera that overlaps with the FOV of the ambient light sensor, by calculating a weighted average of RGB illuminance of those pixels of the VST image that correspond to said part of the FOV of the VST camera that overlaps with the FOV of the ambient light sensor, wherein the weighted average is weighted based on the pre-determined response I of the ambient light sensor; and
determining the RGB illuminance for each pixel of the grayscale image that corresponds to said part of the FOV of the tracking camera, based further on a ratio of the weighted average RGB illuminance (AW) and the average RGB illuminance (A).

A technical effect of calibrating the ambient light sensor in a manner described in both the embodiments is that the RGB illuminance captured by the ambient light sensor in an uncalibrated manner is corrected, so that whenever the RGB illuminance for each pixel of the grayscale image that corresponds to said part of the FOV of the tracking camera is converted to corrected physical lux values.

Optionally, the method comprises storing the determined RGB illuminance for each pixel of the grayscale image in a lighting map.

A technical effect of storing the determined RGB illuminance in such a manner is that the lighting map for the entire real-world environment (i.e., 360 degrees) is generated.

Optionally, the HMD apparatus further comprises at least one light source per eye, wherein the method comprises:
utilising the lighting map to illuminate at least one virtual object that is to be embedded in an extended-reality image; and
displaying the extended-reality image via the at least one light source.

A technical effect of presenting the extended-reality image to the user in such a manner is that by adding illumination to the at least one virtual object based on the lighting map (which comprises lighting conditions based on the real-world environment), the at least one virtual object appear to be integrated and realistic, thereby enhancing an overall quality of the extended-reality experience provided when using the HMD apparatus.

Optionally, the method comprises:
capturing, using the VST camera, a VST image of the real-world environment from the given HMD pose; and
replacing the determined RGB illuminance stored for pixels in the lighting map that lie in the FOV of the VST camera with RGB illuminance of corresponding pixels in the VST image.

A technical effect of replacing the determined RGB pixels in such a manner is that it enables gaining information about how the light is distributed within the FOV of the tracking camera and the FOV of the VST camera.

Optionally, the method comprises:
determining an average VST-based RGB illuminance (V) for the pixels in the lighting map that lie in the FOV of the VST camera, as an average of the RGB illuminance of the corresponding pixels in the VST image;
calculating a re-balanced average RGB illuminance (AR), by dividing a difference between a first multiplication product of the corrected average RGB illuminance (AC) and the FOV of the ambient light sensor ($FOV_A$) and a second multiplication product of the average VST-based RGB illuminance (V) and an overlapping FOV ($FOV_{AV}$) between the VST camera and the ambient light sensor, with a difference between the FOV of the ambient light sensor ($FOV_A$) and the overlapping FOV ($FOV_{AV}$);
re-calculating the average tracking-camera intensity ($I_R$) for a specific part of the FOV of the tracking camera that overlaps with the FOV of the ambient light sensor, but does not overlap with the FOV of the VST camera, based on intensities (i) of those pixels in the grayscale image that correspond to the specific part of the FOV of the tracking camera; and
re-determining the RGB illuminance for each remaining pixel of the grayscale image that lies outside the FOV of the VST camera, based on the re-balanced average RGB illuminance (AR), the ratio of the intensity (i) of said remaining pixel in the grayscale image to the re-calculated average tracking-camera intensity ($I_R$).

A technical effect of re-determining the RGB illuminance for each remaining pixel of the grayscale image that lies outside the FOV of the VST camera is that the lighting map is corrected for entire 360 degrees of the real-world environment.

DETAILED DESCRIPTION OF THE DRAWINGS

Referring to FIG. 1, there is shown a block diagram of an architecture of a head-mounted display (HMD) apparatus 100, in accordance with an embodiment of the present disclosure. The HMD apparatus 100 comprises an ambient light sensor 102, a tracking camera 104, a video-see through camera (VST) camera 106, and at least one processor (depicted as a processor 108). The processor 108 is communicably coupled with the ambient light sensor 102, the tracking camera 104, and the VST camera 106. Optionally, the HMD apparatus 100 further comprises at least one light source (depicted as a light source 110) per eye of a user. The processor 108 is optionally communicably coupled with the light source 110. The processor 108 is configured to perform various operations as described earlier with respect to the aforementioned first aspect.

FIG. 1 is merely an example, which should not unduly limit the scope of the claims herein. A person skilled in the art will recognize many variations, alternatives, and modifications of embodiments of the present disclosure. For example, the light source 110 could be implemented as separate light source per eye.

Figure 2:
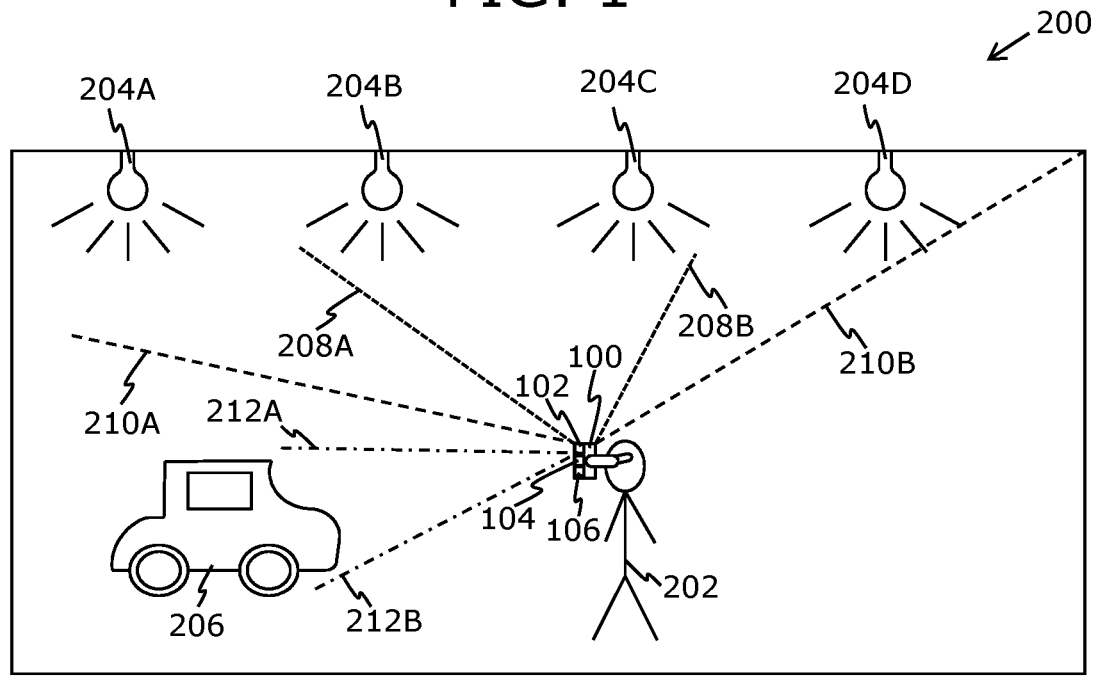
FIG. 2 illustrates an exemplary environment in which a head-mounted display (HMD) apparatus of FIG. 1 is being used, in accordance with an embodiment of the present disclosure.

Referring to FIG. 2, illustrated is an exemplary real-world environment 200 in which a head-mounted display (HMD) apparatus 100 of FIG. 1 is being used, in accordance with an embodiment of the present disclosure. The real-world environment 200 comprises a user 202 wearing the HMD apparatus 100 on his/her head, at least one light source (depicted as light sources 204A, 204B, 204C, and 204D) arranged overhead of the user 202, and a virtual reality object (depicted as a virtual reality car 206) as seen through the HMD in the real-world environment 200. A field of view (FOV) of the ambient light sensor 102 is a region within (square-dotted) lines 208A and 208B, wherein the FOV of the ambient light sensor 102 comprises the light sources 204B and 204C. An FOV of the tracking camera 104 is a region within (dashed) lines 210A and 210B, wherein the FOV of the tracking camera 104 comprises the light sources 204A-D and at least a front view of the user 202, wherein the front view of the user 202 comprises at least a portion of the virtual reality car 206. An FOV of the VST camera 106 is a region within (dash-dotted) lines 212A and 212B, wherein the FOV of the VST camera 106 comprises a front view of the user 202. With reference to FIG. 2, the FOV (the region within the (dashed) lines 210A and 210B) of the tracking camera 104 is wider than the FOV (the region within the (square-dotted) lines 208A and 208B) of the ambient light sensor 102, and a part of the FOV (the region within the (dashed lines) 210A and 210B) of the tracking camera 104 overlaps with the FOV (the region within the (square-dotted) lines 208A and 208B) of the ambient light sensor 102. With reference to FIG. 2, the FOV (the region within the (dash-dotted) lines 212A and 212B) of the VST camera 106 is narrower than the FOV of the ambient light sensor 102, and points in a direction that is different from a direction in which the ambient light sensor 102 is pointing at.

FIG. 2 is merely an example, which should not unduly limit the scope of the claims herein. A person skilled in the art will recognize many variations, alternatives, and modifications of embodiments of the present disclosure. For example, as mentioned earlier, the HMD apparatus is susceptible to utilised for other cases as well where the FOV of the tracking camera 104 is not wider than the FOV of the ambient light sensor 102.

Figure 3:
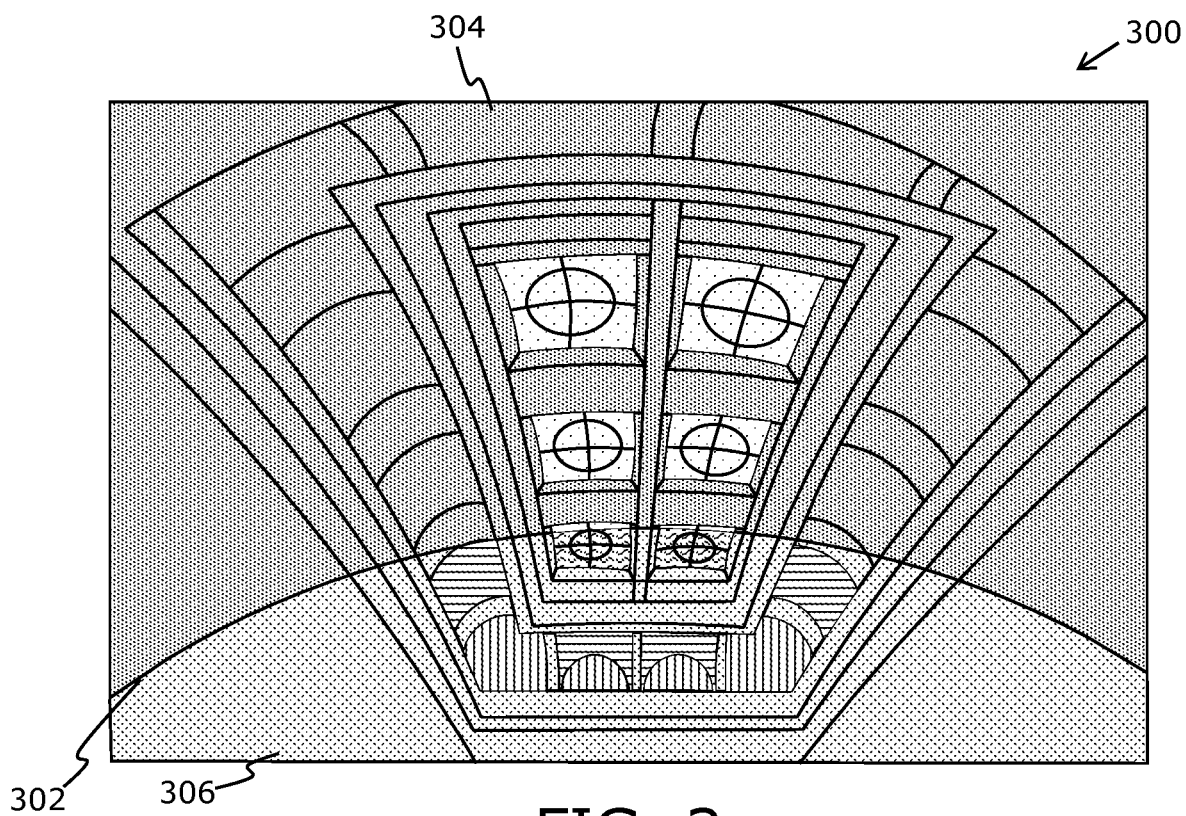
FIG. 3 illustrates an exemplary lighting map of a real-world environment, in accordance with an embodiment of the present disclosure.

Referring to FIG. 3, there is illustrated an exemplary lighting map 300 of a real-world environment, in accordance with an embodiment of the present disclosure. There may be two light sources in the real-world environment, wherein the two light sources may emit light of red colour (represented by horizontal stripes) and blue colour (represented by vertical stripes), respectively. An ambient light sensor is employed to capture an average RGB illuminance of the real-world environment. The lighting map 300 is divided into two parts using a line 302, wherein a portion above the line 302 is a grayscale image 304 captured by a tracking camera, and a portion below the line 302 is a VST image 304 captured by a VST camera. When the tracking camera is used to capture the grayscale image 304 of the real-world environment, the two colours (i.e., the red colour and the blue colour) are indistinguishable from each other. Hence, values of pixels in the grayscale image 304 that indicate intensities (as shown by different dot patterns in the grayscale image 304) of pixels, indicate a colour value that may represent violet colour (i.e., blue colour+red colour=violet colour). The VST camera captures a VST image 306 of the real-world environment, wherein the light source emitting the blue colour is captured. In the lighting map 300, the pixels in the grayscale image 304 indicating the violet colour is replaced with the blue colour (which is one of the actual colour of the two light sources).

The grayscale image 304 representing the first light source may still incorrectly represent the violet colour. Herein, the blue colour represented in the VST image 306 does not sum up to a correct amount of the red colour and the blue colour. To produce the lighting map 300, the blue colour in the average RGB illuminance is reduced, leaving only the red colour for the FOV of the ambient light sensor that overlaps with the FOV of the tracking camera. Hence, the two light sources emitting light of the red colour and the blue colour may be clearly distinguished in the lighting map 300.

FIG. 3 is merely an example, which should not unduly limit the scope of the claims herein. A person skilled in the art will recognize many variations, alternatives, and modifications of embodiments of the present disclosure.

Figure 4:
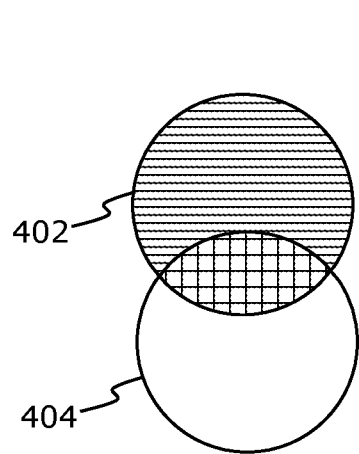
FIG. 4 illustrates an exemplary Venn diagram depicting re-determining RGB illuminance for each remaining pixel of a grayscale image that lies outside an FOV of a VST camera, in accordance with an embodiment of the present disclosure.

Referring to FIG. 4, illustrated is an exemplary diagram 400 of re-determining RGB illuminance for each remaining pixel of a grayscale image that lies outside the FOV of a video-see-through camera (VST) camera, in accordance with an embodiment of the present disclosure. Herein, a corrected average RGB illuminance (AC) is represented by a circle 402. In the circle 402, the corrected average RGB illuminance (AC) is a uniform average of the RGB illuminance of the ambient light sensor over a field of view ($FOV_A$) (as shown by horizontal stripes) of the ambient light sensor. A uniform average of a measured ambient light sensor to VST camera illuminance calibration (V) is represented by a circle 404. In the circle 404, the uniform average of a measured ambient light sensor to the VST camera illuminance calibration (V) is over an overlapping FOV ($FOV_{AV}$) between the VST camera and the ambient light sensor, wherein the overlapping FOV ($FOV_{AV}$) between the VST camera and the ambient light sensor is represented by an overlapping portion between the circle 402 and the circle 404. A re-balanced average RGB illuminance (AR) is determined, which is the corrected average RGB illuminance (AC), excluding the overlapping FOV between the VST camera and the ambient light sensor (i.e., except over difference between the FOV of the ambient light sensor ($FOV_A$) and the overlapping FOV ($FOV_{AV}$)).

FIG. 4 is merely an example, which should not unduly limit the scope of the claims herein. A person skilled in the art will recognize many variations, alternatives, and modifications of embodiments of the present disclosure.

Figure 5:
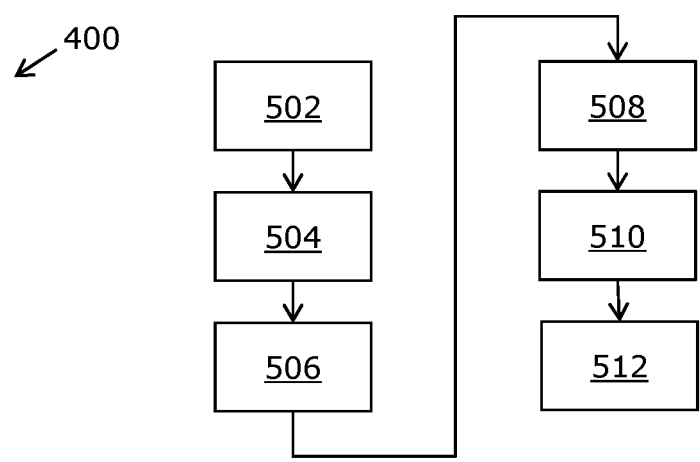
FIG. 5 illustrates a flowchart depicting steps of a method for generating a lighting map implemented by a head-mounted display (HMD) apparatus comprising an ambient light sensor, a tracking camera, a video-see through (VST) camera, and at least one processor, in accordance with an embodiment of the present disclosure.

Referring to FIG. 5, illustrated is a flowchart depicting steps of a method for generating a lighting map implemented by a head-mounted display (HMD) apparatus comprising an ambient light sensor, a tracking camera, a video-see through (VST) camera, and at least one processor, in accordance with an embodiment of the present disclosure. At step 502, an average red-green-blue (RGB) illuminance (A) of a given region of a real-world environment is captured, using the ambient light sensor, from a given HMD pose, wherein the given region of the real-world environment corresponds to the FOV of the ambient light sensor from a perspective of the given HMD pose. At step 504, a grayscale image of the real-world environment is captured, using the tracking camera, from the given HMD pose, wherein values of pixels in the grayscale image indicate intensities (i) of the pixels. At step 506, an average tracking-camera intensity (I) is calculated for the part of the FOV of the tracking camera that overlaps with the FOV of the ambient light sensor, based on intensities (i) of those pixels in the grayscale image that correspond to said part of the FOV of the tracking camera. At step 508, an average illuminance (J) is calculated for said part of the FOV of the tracking camera that overlaps with the FOV of the ambient light sensor, based on the intensities (i) of those pixels in the grayscale image that correspond to said part of the FOV of the tracking camera and a pre-determined response (r) of the ambient light sensor. At step 510, a corrected average RGB illuminance (AC) is calculated for the given region of the real-world environment from the given HMD pose, based on the average RGB illuminance (A) of the given region and a ratio of the average tracking-camera intensity (I) and the average illuminance (J). At step 512, an RGB illuminance for each pixel of the grayscale image is determined that corresponds to said part of the FOV of the tracking camera, based on the corrected average RGB illuminance (AC) for the given region, a ratio of an intensity (i) of said pixel in the grayscale image to the average tracking-camera intensity (I).

The aforementioned steps are only illustrative and other alternatives can also be provided where one or more steps are added, one or more steps are removed, or one or more steps are provided in a different sequence without departing from the scope of the claims herein.

The invention claimed is:

1. A head-mounted display (HMD) apparatus comprising:
an ambient light sensor;
a tracking camera, wherein at least a part of a field of view (FOV) of the tracking camera overlaps with an FOV of the ambient light sensor;
a video-see-through (VST) camera; and
at least one processor configured to:
   capture, using the ambient light sensor, an average red-green-blue (RGB) illuminance (A) of a given region of a real-world environment from a given HMD pose, wherein the given region of the real-world environment corresponds to the FOV of the ambient light sensor from a perspective of the given HMD pose;
   capture, using the tracking camera, a grayscale image of the real-world environment from the given HMD pose, wherein values of pixels in the grayscale image indicate intensities (i) of the pixels;
   calculate an average tracking-camera intensity (I) for the part of the FOV of the tracking camera that overlaps with the FOV of the ambient light sensor, based on intensities (i) of those pixels in the grayscale image that correspond to said part of the FOV of the tracking camera;
   calculate an average illuminance (J) for said part of the FOV of the tracking camera that overlaps with the FOV of the ambient light sensor, based on the intensities (i) of those pixels in the grayscale image that correspond to said part of the FOV of the tracking camera and a pre-determined response (r) of the ambient light sensor;
   calculate a corrected average RGB illuminance (AC) for the given region of the real-world environment from the given HMD pose, based on the average RGB illuminance (A) of the given region and a ratio of the average tracking-camera intensity (I) and the average illuminance (J); and
   determine an RGB illuminance for each pixel of the grayscale image that corresponds to said part of the FOV of the tracking camera, based on the corrected average RGB illuminance (AC) for the given region, a ratio of an intensity (i) of said pixel in the grayscale image to the average tracking-camera intensity (I).

2. The HMD apparatus of claim 1, wherein the at least one processor is configured to:
capture, using the VST camera, a VST image of the real-world environment from the given HMD pose;
determine an uncalibrated RGB illuminance for each pixel of the grayscale image that corresponds to said part of the FOV of the tracking camera, based on the corrected average RGB illuminance (AC) for the given region, the ratio of the intensity (i) of said pixel in the grayscale image to the average tracking-camera intensity (I);
store the uncalibrated RGB illuminance for each pixel of the grayscale image in an uncalibrated lighting map;
find a part of the uncalibrated lighting map that corresponds to a part of an FOV of the VST camera that overlaps with the FOV of the ambient light sensor (102);
calculate an average uncalibrated RGB illuminance (AU) of pixels of said part of the uncalibrated lighting map;
calculate an average (VI) of RGB illuminance of those pixels of the VST image that correspond to said part of the FOV of the VST camera that overlaps with the FOV of the ambient light sensor; and
determine the RGB illuminance for each pixel of the grayscale image that corresponds to said part of the FOV of the tracking camera, based further on a ratio of the average (VI) of the RGB illuminance and the average uncalibrated RGB illuminance (AU).

3. The HMD apparatus of claim 1, wherein the at least one processor is configured to:
capture, using the VST camera, a VST image of the real-world environment from the given HMD pose;
calculate a weighted average RGB illuminance (AW) captured by a part of an FOV of the VST camera that overlaps with the FOV of the ambient light sensor, by calculating a weighted average of RGB illuminance of those pixels of the VST image that correspond to said part of the FOV of the VST camera that overlaps with the FOV of the ambient light sensor, wherein the weighted average is weighted based on the pre-determined response (r) of the ambient light sensor; and
determine the RGB illuminance for each pixel of the grayscale image that corresponds to said part of the FOV of the tracking camera, based further on a ratio of the weighted average RGB illuminance (AW) and the average RGB illuminance (A).

4. The HMD apparatus of claim 1, wherein the at least one processor is configured to store the determined RGB illuminance for each pixel of the grayscale image in a lighting map.

5. The HMD apparatus of claim 4, further comprising at least one light source per eye, wherein the at least one processor is configured to:
utilise the lighting map to illuminate at least one virtual object that is to be embedded in an extended-reality image; and
display the extended-reality image via the at least one light source.

6. The HMD apparatus of claim 4, wherein the at least one processor is configured to:
capture, using the VST camera, a VST image of the real-world environment from the given HMD pose; and
replace the determined RGB illuminance stored for pixels in the lighting map that lie in an FOV of the VST camera with RGB illuminance of corresponding pixels in the VST image.

7. The HMD apparatus of claim 6, wherein the at least one processor is configured to:
determine an average VST-based RGB illuminance (V) for the pixels in the lighting map that lie in the FOV of the VST camera, as an average of the RGB illuminance of the corresponding pixels in the VST image;
calculate a re-balanced average RGB illuminance (AR), by dividing a difference between a first multiplication product of the corrected average RGB illuminance (AC) and the FOV of the ambient light sensor ($FOV_A$) and a second multiplication product of the average VST-based RGB illuminance (V) and an overlapping FOV ($FOV_{AV}$) between the VST camera and the ambient light sensor, with a difference between the FOV of the ambient light sensor ($FOV_A$) and the overlapping FOV ($FOV_{AV}$);

re-calculate the average tracking-camera intensity ($I_R$) for a specific part of the FOV of the tracking camera that overlaps with the FOV of the ambient light sensor, but does not overlap with the FOV of the VST camera, based on intensities (i) of those pixels in the grayscale image that correspond to the specific part of the FOV of the tracking camera; and re-determine the RGB illuminance for each remaining pixel of the grayscale image that lies outside the FOV of the VST camera, based on the re-balanced average RGB illuminance (AR), the ratio of the intensity (i) of said remaining pixel in the grayscale image to the re-calculated average tracking-camera intensity ($I_R$).

8. A method implemented by a head-mounted display (HMD) apparatus comprising an ambient light sensor, a tracking camera, a video-see-through (VST) camera, at least one processor, wherein the method comprises:

capturing, using the ambient light sensor, an average red-green-blue (RGB) illuminance (A) of a given region of a real-world environment from a given HMD pose, wherein the given region of the real-world environment corresponds to an FOV of the ambient light sensor from a perspective of the given HMD pose;

capturing, using the tracking camera, a grayscale image of the real-world environment from the given HMD pose, wherein values of pixels in the grayscale image indicate intensities (i) of the pixels;

calculating an average tracking-camera intensity (I) for a part of the FOV of the tracking camera that overlaps with the FOV of the ambient light sensor, based on intensities (i) of those pixels in the grayscale image that correspond to said part of an FOV of the tracking camera;

calculating an average illuminance (J) for said part of the FOV of the tracking camera that overlaps with the FOV of the ambient light sensor, based on the intensities (i) of those pixels in the grayscale image that correspond to said part of the FOV of the tracking camera and a pre-determined response (r) of the ambient light sensor;

calculating a corrected average RGB illuminance (AC) for the given region of the real-world environment from the given HMD pose, based on the average RGB illuminance (A) of the given region and a ratio of the average tracking-camera intensity (I) and the average illuminance (J); and determining an RGB illuminance for each pixel of the grayscale image that corresponds to said part of the FOV of the tracking camera, based on the corrected average RGB illuminance (AC) for the given region, a ratio of an intensity (i) of said pixel in the grayscale image to the average tracking-camera intensity (I).

9. The method of claim 8, wherein the method comprises:

capturing, using the VST camera, a VST image of the real-world environment from the given HMD pose;

determining an uncalibrated RGB illuminance for each pixel of the grayscale image that corresponds to said part of the FOV of the tracking camera, based on the corrected average RGB illuminance (AC) for the given region, the ratio of the intensity (i) of said pixel in the grayscale image to the average tracking-camera intensity (I);

storing the uncalibrated RGB illuminance for each pixel of the grayscale image in an uncalibrated lighting map;

finding a part of the uncalibrated lighting map that corresponds to a part of an FOV of the VST camera that overlaps with the FOV of the ambient light sensor;

calculating an average uncalibrated RGB illuminance (AU) of pixels of said part of the uncalibrated lighting map;

calculating an average (VI) of RGB illuminance of those pixels of the VST image that correspond to said part of the FOV of the VST camera that overlaps with the FOV of the ambient light sensor; and determining the RGB illuminance for each pixel of the grayscale image that corresponds to said part of the FOV of the tracking camera, based further on a ratio of the average (VI) of the RGB illuminance and the average uncalibrated RGB illuminance (AU).

10. The method of claim 8, wherein the method comprises:

capturing, using the VST camera, a VST image of the real-world environment from the given HMD pose;

calculating a weighted average RGB illuminance (AW) captured by a part of an FOV of the VST camera that overlaps with the FOV of the ambient light sensor, by calculating a weighted average of RGB illuminance of those pixels of the VST image that correspond to said part of the FOV of the VST camera that overlaps with the FOV of the ambient light sensor, wherein the weighted average is weighted based on the pre-determined response (r) of the ambient light sensor; and determining the RGB illuminance for each pixel of the grayscale image that corresponds to said part of the FOV of the tracking camera, based further on a ratio of the weighted average RGB illuminance (AW) and the average RGB illuminance (A).

11. The method of claim 8, wherein the method comprises storing the determined RGB illuminance for each pixel of the grayscale image in a lighting map.

12. The method of claim 11, the HMD apparatus further comprising at least one light source per eye, wherein the method comprises:

utilising the lighting map to illuminate at least one virtual object that is to be embedded in an extended-reality image; and displaying the extended-reality image via the at least one light source.

13. The method of claim 11, wherein the method comprises:

capturing, using the VST camera, a VST image of the real-world environment from the given HMD pose; and replacing the determined RGB illuminance stored for pixels in the lighting map that lie in an FOV of the VST camera with RGB illuminance of corresponding pixels in the VST image.

14. The method of claim 13, wherein the method comprises:

determining an average VST-based RGB illuminance (V) for the pixels in the lighting map that lie in the FOV of the VST camera, as an average of the RGB illuminance of the corresponding pixels in the VST image;

calculating a re-balanced average RGB illuminance (AR), by dividing a difference between a first multiplication product of the corrected average RGB illuminance (AC) and the FOV of the ambient light sensor ($FOV_A$) and a second multiplication product of the average VST-based RGB illuminance (V) and an overlapping FOV ($FOV_{AV}$) between the VST camera and the ambient light sensor, with a difference between the FOV of the ambient light sensor ($FOV_A$) and the overlapping FOV ($FOV_{AV}$);

re-calculating the average tracking-camera intensity ($I_R$) for a specific part of the FOV of the tracking camera that overlaps with the FOV of the ambient light sensor, but does not overlap with the FOV of the VST camera, based on intensities (i) of those pixels in the grayscale image that correspond to the specific part of the FOV of the tracking camera; and re-determining the RGB illuminance for each remaining pixel of the grayscale image that lies outside the FOV of the VST camera, based on the re-balanced average RGB illuminance (AR), the ratio of the intensity (i) of said remaining pixel in the grayscale image to the re-calculated average tracking-camera intensity ($I_R$).

\* \* \* \* \*